3,036,067
3-AMINOALKYL ESTERS OF 17-OXYGENATED ANDROST-(AN AND 5-EN)-3β-OLS

Arthur H. Goldkamp, Glencoe, Ill., assignor to G. D. Searle & Co., Chicago, Ill., a corporation of Delaware
No Drawing. Filed Dec. 2, 1960, Ser. No. 73,179
7 Claims. (Cl. 260—239.5)

This invention relates to 3-aminoalkyl esters of 17-oxygenated androst-5-en-3-ols, 5,6-dihydro compounds corresponding thereto, and processes whereby these chemical compounds can be manufactured. More particularly, this invention relates to products of the formula

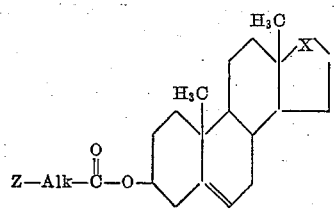

and 5α,6-dihydro compounds identical therewith except for the absence of the 5(6) double bond, Z in the formula being representative of an optionally-alkylated amino radical; Alk an alkylene radical; and X is a carbonyl, hydroxymethylene, or alkanoyloxymethylene radical.

The symbol, Z, subsumes both the primary amino radical, —NH$_2$, and secondary and tertiary amino radicals wherein one or two alkyl or hydroxyalkyl groupings are present. Among the latter groupings, especially lower alkyl and hydroxy(lower alkyl) radicals are preferred. Illustrative of lower alkyl radicals are methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like —C$_n$H$_{2n+1}$ groupings wherein $n$ represents a positive integer amounting to less than 9.

When the amino radical represented by Z is substituted by one or two alkyl or hydroxyalkyl groupings, the substituent groupings can be either discrete, as for example when Z designates a radical of the formula

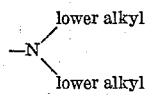

or they can be joined together directly or through oxygen or a second nitrogen to compose cyclic amino radicals optimally comprising at least 4 carbon atoms. Illustrative of the cyclic amino radicals contemplated by Z are pyrrolidino, 2-methylpyrrolidino, 2,5-dimethylpyrrolidino, 3-methyl-4-ethylpyrrolidino, piperidino, 3-methylpiperidino, 2,6-dimethylpiperidino, morpholino, piperazino, 4-methylpiperazino, 4-hydroxyethylpiperazino, and like monovalent, 5- and 6-membered heterocyclic groupings. The terminal "ino" in the radical names set forth denotes attachment of the radicals thus identified via nitrogen.

The alkylene radicals represented by Alk, like the alkyl and hydroxyalkyl groupings comprehended when Z represents a secondary or tertiary amino radical, are most desirably of lower order. Typical of lower alkylene radicals are methylene, ethylene, trimethylene, 1,2-propylene, 2,2-dimethyl-1,3-propylene, tetramethylene, and homologous, bivalent, saturated, acyclic, straight- or branched-chain hydrocarbon groupings embracive of fewer than 9 carbon atoms.

Both the hydroxymethylene and alkanoyloxymethylene radicals represented by X are desirably, though not necessarily exclusively, those wherein the oxygenated methylene substituent is in beta configuration relative to the steroid nucleus; and the alkyl constituents of the alkanoyloxymethyl radicals comprehended

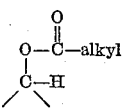

are, again, optimally lower alkyl groupings.

Equivalent to the foregoing amine esters for purposes of the present invention are non-toxic acid addition and quaternary ammonium salts of the formula

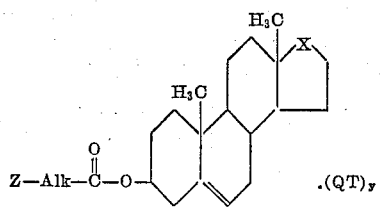

and 5α,6-dihydro salts corresponding, Z, Alk, and X being defined as before; Q representing hydrogen or a lower alkyl, hydroxy(lower alkyl), or lower alkenyl radical, as also such aralkyl radicals as benzyl, phenethyl, and naphthylmethyl; T representing one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like—which, in combination with the cationic portion of a salt aforesaid, is neither pharmacologically nor otherwise undesirable in physiological dosage; and $y$ representing 1 except when Z comprises a piperazino or other dibasic amino radical, in which case $y$ represents either 1 or 2.

The compounds of this invention are useful because of their valuable pharmacological properties. Thus, for example, they are anti-hormonal agents adapted, inter alia, to inhibit the effects of androgens on the secondary sex characteristics and counteract the tendency of cortisone to promote the spread of infection. Moreover, they manifest selectively potent anti-cholesterologenic activity.

Manufacture of the claimed products proceeds by heating together, preferably in an inert solvent and with a catalyst such as sodium iodide present, a steroid of the formula

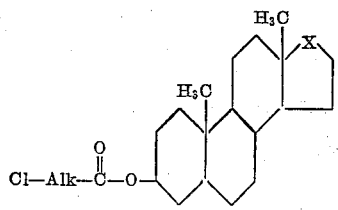

there being a 5(6) double bond present if such is desired in the reaction product, with an amine of the formula $$Z—H$$

Z, Alk, and X in the formulas being defined as before. Alternatively, the 17β-hydroxy products hereof derive from the corresponding 17-ones by sodium borohydride reduction in cold aqueous ethanol; and the 17-alcohols in turn, are converted to corresponding alkanoic acid esters by warming with alkanoic acid anhydride in pyridine.

Conversion of the amine bases hereof to corresponding acid addition salts is accomplished by simple admixture of these compounds with either 1 or 2 equivalents of any of various inorganic and strong organic acids, the anionic portion of which conforms to T as hereinabove defined.

The quaternary ammonium compounds comprehended by the invention are those derived by contacting a claimed base with an organic ester of the formula $$Q'—T$$

Q' being identical with Q except that it never represents hydrogen and T having the same meaning assigned previously. Quaternization takes place in the temperature range between 25° and 100° centigrade, using an inert solvent such as chloroform, acetone, butanone, methanol, butanol, or the like as reaction medium. Quaternization is ordinarily completed in from 1 to 48 hours and is generally carried out in a closed system if a lower alkyl halide—such as methyl chloride—is one of the reagents. Using methyl bromide, the manufacture of quaternary salt may be smoothly effected in butanone solution at 70° centigrade, the reaction time being approximately 45 minutes.

The following examples describe in detail compounds illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted. Specific rotations refer to the D line of sodium, observations being made in chloroform solution.

*Example 1*

*3β - (3 - pyrrolidinopropionyloxy)androst - 5 - en-17β-ol.*—To a solution of 2 parts of 3β-(3-pyrrolidinopropionyloxy)androst-5-en-17-one (preparable by the procedure of Example 5A hereinafter) in 40 parts of ethanol is added, with agitation at 5–10°, a solution of 2 parts of sodium borohydride in 24 parts of approximately 85% ethanol. Two minutes later, the reaction mixture is diluted with 3 volumes of ice water. The solid precipitate, filtered off and recrystallized from acetone, affords 3β-(3-pyrrolidinopropionyloxy)androst-5-en-17β-ol, melting at 165–168° and having a specific rotation of —46°. The product has the formula

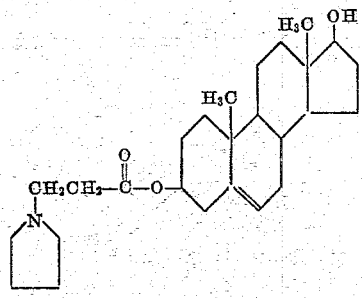

*Example 2*

*17β - acetoxy - 3β - (3 - pyrrolidinopropionyloxy) - androst-5-ene.*—A solution of 2 parts of 3β-(3-pyrrolidinopropionyloxy)androst-5-en-17β-ol in a mixture of 10 parts of pyridine and 10 parts of acetic anhydride is let stand at room temperatures overnight, then partitioned between water and ether. The ethereal phase is separated, dried over anhydrous sodium sulfate, and stripped of solvent by distillation. The residue, recrystallized from a mixture of dichloromethane and ether, affords 17β-acetoxy-3β-(3-pyrrolidinopropionyloxy)androst-5-ene, melting at 159.5–163°. The product has the formula

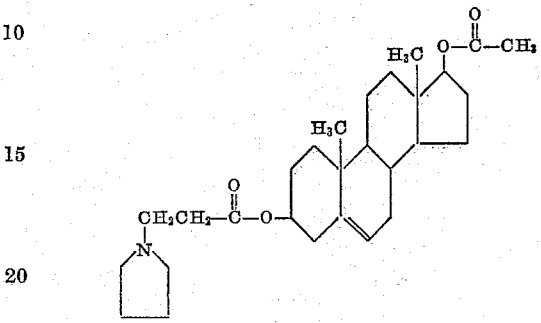

*Example 3*

A. *3β-(chloroacetoxy)androst-5-en-17-one.*—To a solution of 20 parts of chloroacetyl chloride in 100 parts of benzene is added, with agitation at the boiling point under reflux, a solution of 50 parts of 3β-hydroxyandrost-5-en-17-one in 14 parts of pyridine. The resultant mixture is maintained with agitation at the boiling point under reflux for 1 hour, then cooled and partitioned between ether and water. The ether phase is separated, dried over anhydrous sodium sulfate, and stripped of solvent by distillation. The residue is 3β-(chloroacetoxy)androst-5-en-17-one.

B. *3β-(dimethylaminoacetoxy)androst-5-en-17-one.*—To approximately 65 parts of 3β-(chloroacetoxy)androst-5-en-17-one in 100 parts of toluene at about 0° is added, with agitation, 10 parts of dimethylamine and 1 part of sodium iodide. The resultant mixture is transferred to a sealed vessel and maintained therein at 80° for 5 hours, then cooled and consecutively washed with dilute aqueous sodium bicarbonate and water. It is then dried over anhydrous sodium sulfate and stripped of solvent by vacuum distillation. The residue is 3β-(dimethylaminoacetoxy)-androst-5-en-17-one, of the formula

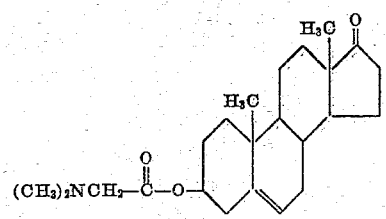

*Example 4*

A. *3β - (3 - chloropropionyloxy)androst - 5 - en - 17-one.*—To a solution of 20 parts of 3β-hydroxyandrost-5-en-17-one in 20 parts of 2,6-dimethylpyridine is added, with agitation, 160 parts of benzene followed by 20 parts of 3-chloropropionyl chloride. The resultant mixture is heated at the boiling point under reflux with continued agitation for 1 hour, then poured onto ice. The benzene phase is separated and washed with water, then dried over anhydrous sodium sulfate and finally stripped of solvent by vacuum distillation. The residue is 3β-(3-chloropropionyloxy)androst-5-en-17-one.

B. *3β - (3 - Diethylaminopropionyloxy)androst - 5-en-17-one.*—To a solution of approximately 35 parts of 3β-(3-chloropropionyloxy)androst-5-en-17-one in 200 parts of acetone is added 4 parts of sodium iodide and 7 parts of diethylamine. The resultant mixture is heated at the boiling point under reflux with agitation for 4½ hours, then poured into 3 volumes of dilute aqueous sodium bicarbonate. The mixture thus obtained is extracted with ether. The ether extract is washed with water and then dried over anhydrous sodium sulfate. Distillation of solvent affords, as the residue, 3β-(3-diethylaminopropionyloxy)androst-5-en-17-one, of the formula

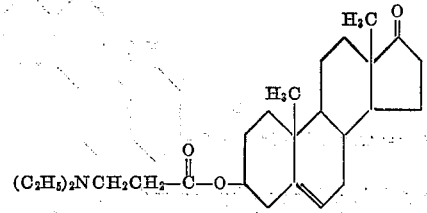

Example 5

A. *3β - (3 - pyrrolidinopropionyloxy)androst - 5 - en-17-one.*—A mixture of 42 parts of 3β-(3-chloropropionyloxy)androst-5-en-17-one, 8 parts of sodium iodide, 15 parts of pyrrolidine, and 440 parts of acetone is heated with agitation at the boiling point under reflux for 4½ hours, then diluted with approximately 3 volumes of ice water. The solid product thrown down, filtered off and dried in air, melts at 102–111° and has a specific rotation of +4.0°. This material is 3β-(3-pyrrolidinopropionyloxy)androst-5-en-17-one, of the formula

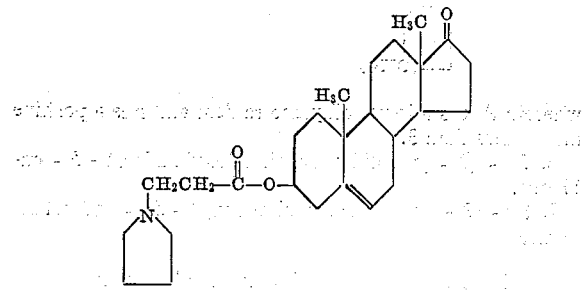

B. *3β - (3 - pyrrolidinopropionyloxy)androst - 5 - en-17-one hydrochloride.*—From a 2-propanolic solution of 3β - (3 - pyrrolidinopropionyloxy)andrst - 5 - en - 17-one, on acidification with concentrated hydrochloric acid, there precipitates 3β-(3-pyrrolidinopropionyloxy)androst-5-en-17-one hydrochloride, which melts at 217–221° and has a specific rotation of +6.5°.

C. *3β - (3 - pyrrolidinopropionyloxy)androst - 5 - en-17-one methyl iodide.*—To a solution of 3 parts of 3β-(3-pyrrolidinopropionyloxy)androst-5-en-17-one in 20 parts of ether is added a solution of 3 parts of methyl iodide in 5 parts of ether. The product which precipitates is filtered off after 2 hours at room temperatures and dried in air. This material is 3β-(3-pyrrolidinopropionyloxy)-androst-5-en-17-one methyl iodide melting at 202–203.5°.

D. *3β - (3 - pyrrolidinopropionyloxy)androst - 5 - en-17-one benzyl chloride.*—A solution of 3 parts of 3β-(3-pyrrolidinopropionyloxy)androst-5-en-17-one and 1 part of benzyl chloride in 25 parts of ether is heated to the boiling point under reflux, then stripped of solvent by distillation. The residue, recrystallized from water, affords 3β-(3-pyrrolidinopropionyloxy)androst-5-en-*17*-one benzyl chloride.

Example 6

*3β - (3 - piperidinopropionyloxy)androst - 5 - en - 17-one.*—A mixture of 20 parts of 3β-(3-chloropropionyloxy)androst-5-en-17-one, 4 parts of sodium iodide, 7 parts of piperidine, and 200 parts of acetone is heated at the boiling point under reflux for 6 hours, then cooled and partitioned between water and a 1:10 mixture of dichloromethane and ether. The dichloromethane-ether phase is separated and consecutively washed with dilute aqueous sodium bicarbonate and water, then dried over anhydrous sodium sulfate, and finally precipitated by addition of petroleum ether (B.P. 63–71°). The solid product thrown down is filtered off and dried in air. It melts at 148–151° and has a specific rotation of +4.5°. This material is 3β-(3-piperidinopropionyloxy)androst-5-en-17-one, of the formula

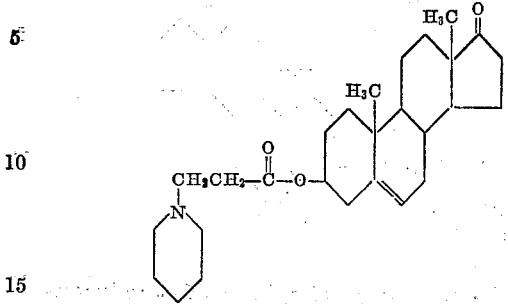

Example 7

*3β-(3-chlorobutyryloxy)androst-5-en-17-one.*—To a solution of 50 parts of 3β-hydroxyandrost-5-en-17-one in 50 parts of 2,6-dimethylpyridine is added, with agitation at 5–10°, 400 parts of benzene followed by 46 parts of 2-chlorobutyryl chloride. The resultant mixture is heated at the boiling point under reflux for 1 hour, then poured into 4 volumes of ice water. The benzene phase is separated, washed with water, dried over anhydrous sodium sulfate, and stripped of solvent by vacuum distillation. The residue is 3β-(3-chlorobutyryloxy)androst-5-en-17-one.

B. *3β - (3 - pyrrolidinobutyryloxy)androst - 5 - en-17-one.*—To a solution of 85 parts of 3β-(3-chlorobutyryloxy)androst-5-en-17-one in 500 parts of acetone is added 18 parts of pyrrolidine and 10 parts of sodium iodide. The resultant mixture is heated with agitation at the boiling point for 4½ hours, then poured into 3 volumes of ice water. The resultant mixture is extracted with dichloromethane. The dichloromethane extract is separated, dried over anhydrous sodium sulfate, and stripped of solvent by vacuum distillation. The residue is the desired 3β-(3-pyrrolidinobutyryloxy)androst-5-en-17-one, of the formula

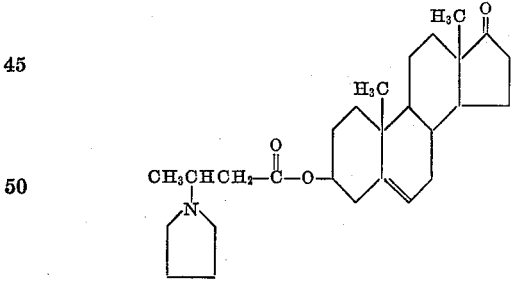

Example 8

A. *3β - (3 - chloropropionyloxy) - 5α - androstan - 17-one.*—To a solution of 20 parts of 3β-hydroxy-5α-androstan-17-one in 20 parts of 2,6-dimethylpyridine is added, with agitation, 160 parts of benzene followed by 20 parts of 3-chloropropionyl chloride. The resultant mixture is heated at room temperatures for 3 hours, then poured into 3 volumes of ice water. The benzene phase is separated, washed with water, dried over anhydrous sodium sulfate, and finally stripped of solvent by vacuum distillation. The residue is 3β-(3-chloropropionyloxy)-5α-androstan-17-one B. *3β - (3 - pyrrolidinopropionyloxy) - 5α -androstan-17-One.*—A mixture of 70 parts of 3β-(3-chloropropionyloxy)-5α-androstan-17-one, 14 parts of sodium iodide, 28 parts of pyrrolidine, and 400 parts of acetone is heated at the boiling point under reflux with agitation for 4 hours, then cooled and partitioned between ether and dilute aqueous sodium carbonate. The ethereal phase is separated and washed with water. Upon evaporation of solvent, there remains as the residue, 3β-(3-pyrrolidinopropionyloxy)-5α-androstan-17-one, of the formula

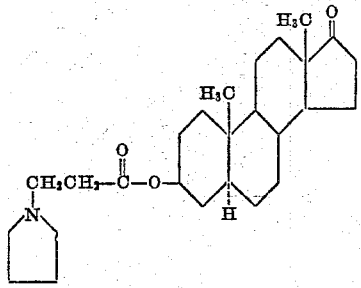

C. *3β - (3 - pyrolidinopropionyloxy) - 5α - androstan-17-one hydrochloride.*—From an anhydrous ethereal solution of 3β-(3-pyrrolidinopropionyloxy)-5α-androstan-17-one, upon acidification with hydrogen chloride, there precipitates 3β-(3-pyrrolidinopropionyloxy)-5α-androstan-17-one hydrochloride which, filtered off and recrystallized from 2-propanol, melts at 201–202.5° and has a specific rotation of +54.6°.

What is claimed is:

1. A compound selected from the group consisting of compounds of the formula

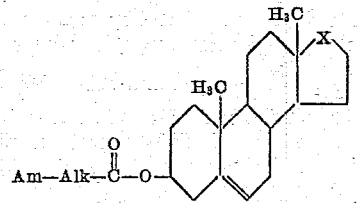

and 5α,6-dihydro compounds corresponding thereto, Am in the formula being selected from the group consisting of di(lower alkyl)amino, pyrrolidino, and piperidino radicals; Alk in the formula being a lower alkylene radical; and X in the formula being selected from the group consisting of carbonyl, β-hydroxymethylene, and β-(lower alkanoyl)oxymethylene radicals.

2. 3β-(3-pyrrolidinopropionyloxy)androst-5-en-17β-ol.
3. A compound of the formula

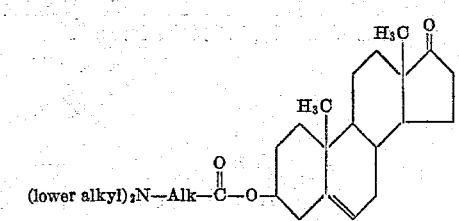

wherein Alk is a lower alkylene radical.

4. 3β - (3 - diethylaminopropionyloxy)'androst - 5 - en-17-one.

5. A compound of the formula

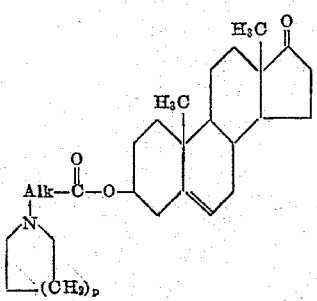

wherein Alk is a lower alkylene radical and $p$ is a positive integer less than 3.

6. 3β - (3 - pyrrolidinopropionyloxy)androst - 5 - en-17-one.

7. 3β - (3 - pyrrolidinopropionyloxy) - 5α - androstan-17-one.

References Cited in the file of this patent
UNITED STATES PATENTS

| 2,173,423 | Miescher et al. | Sept. 19, 1939 |
| 2,874,173 | Hogg et al. | Feb. 17, 1959 |